(12) United States Patent
Hyder et al.

(10) Patent No.: US 7,676,515 B2
(45) Date of Patent: Mar. 9, 2010

(54) SYSTEMS AND METHODS FOR RECRUITER RATING

(75) Inventors: Adam Hyder, Los Altos, CA (US); Chyr-Chong Joseph Ting, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 240 days.

(21) Appl. No.: 11/609,136

(22) Filed: Dec. 11, 2006

(65) Prior Publication Data
US 2008/0140430 A1 Jun. 12, 2008

(51) Int. Cl.
*G06F 17/00* (2006.01)
(52) U.S. Cl. .............. 707/648; 707/947; 705/14.73
(58) Field of Classification Search .......... 707/999.001, 707/999.003, 999.01, 999.1, 999.107; 705/1, 705/8, 14.73, 35
See application file for complete search history.

(56) References Cited

U.S. PATENT DOCUMENTS

2002/0133369 A1* 9/2002 Johnson ................ 705/1
2003/0084051 A1* 5/2003 Depura et al. .......... 707/10

OTHER PUBLICATIONS

Njoyn, Njoyne: e-Recruiting and Application Tracking Solution, Nov. 2006, pp. 1-6.*
Commonwealth of Virginia, Recruitment Management System, 2005, pp. 1-51.*

* cited by examiner

*Primary Examiner*—Fred I Ehichioya
(74) *Attorney, Agent, or Firm*—James J. DeCarlo; Greenberg Traurig, LLP

(57) ABSTRACT

Methods and systems of providing a rating of a recruiter are disclosed herein. A plurality of job listings to be posed is received from a recruiter. One or more modifications of at least one of the plurality of job listings are received within a period of time. A modification rate indicative of a rate at which a recruiter modifies job listings is calculated. The modification rate can be calculated by dividing the number of the one or more modifications by the number of the plurality of job listings posted by the recruiter. A recruiter profile can be tagged with a high modification indicator if the calculated modification rate is higher than a predetermined modification threshold.

12 Claims, 8 Drawing Sheets

400

YAHOO! hotjobs

Yahoo! Job Posting — Help

Title
402 — [ ]

Details
404 —
| company Type | Attribute Value | (x) |
| experience Type | Attribute Value | (x) |
| salary Type | Attribute Value | (x) |
| degree Type | Attribute Value | (x) |
| start date Type | Attribute Value | (x) |
| location Type | Attribute Value | (x) |

Keywords
406 — [ ]
[Clear]

Description
408 — [ ]
[Clear]

[Submit] [Preview] [Cancel]

*FIG. 4*

SYSTEMS AND METHODS FOR RECRUITER RATING

BACKGROUND

1. Field

The present disclosure relates to job listing services. In particular, it relates to systems and methods of monitoring recruiter activity, reputation, and combating abuse.

2. General Background

Job listing providers generally provide searchable databanks of job listings related to employment opportunities and openings. In the current generation of online job listing services, listing service providers provide job searching capabilities to jobseekers based on search keywords entered by the jobseeker. In addition, listing service providers allows recruiters to post job listings for employment opportunities. Job postings are generally listed by the order of the posting date in order to present to the jobseeker the newest jobs listings. In an attempt to keep their listings at the top of search results, recruiters frequently repost jobs. This can result in old job listings being at the top of search results while genuinely new job postings are relegated less visible positions within a search result list.

SUMMARY

Methods and systems of providing a rating of a recruiter are disclosed herein. A plurality of job listings to be posted is received from a recruiter. One or more modifications of at least one of the plurality of job listings are received within a period of time. A modification rate indicative of a rate at which a recruiter modifies job listings is calculated. The modification rate can be calculated by dividing the number of the one or more modifications by the number of the plurality of job listings posted by the recruiter. A recruiter profile can be tagged with a high modification indicator if the calculated modification rate is higher than a predetermined modification threshold.

In a further aspect, a search for job listings is received from a jobseeker. The search for job listings can include search criteria. A list of search results that match the search criteria is identified. The list of search results can include at least one job listing posted by the recruiter. The relevancy of the at least one job listing in the list of search results is decreased if the recruiter profile includes a high modification indicator. The relevancy can be decreased by reprioritizing the list of search results such that the at least one job listing is displayed towards the bottom of a display of the list of search results.

In one aspect, the job listings associated with the recruiter are tagged with a high modification indicator. The high modification indicator can be removed when the calculated modification rate is lower than the predetermined modification threshold.

In another aspect, there is a system of providing a rating of a recruiter. The system can include job posting and modification module, a rating module, and a tagging module. The job posting and modification module receives from a recruiter a plurality of job listings to be posted. The job posting and modification module can be configured to receive one or more modifications of at least one of the plurality of job listings within a period of time. The rating module can calculate a modification rate indicative of a rate at which a recruiter modifies job listings. The modification rate can be calculated by dividing the number of the plurality of modifications by the number of the plurality of job listings posted by the recruiter. The tagging module tags a recruiter profile with a high modification indicator if the calculated modification rate is higher than a predetermined modification threshold.

In one aspect, there is a method of providing a rating of a recruiter. A modification rate indicative of a rate at which a recruiter modifies job listings previously posted by the recruiter can be calculated. The modification rate can be calculated by dividing the number of modifications made in a period of time by the number of job listings posted by the recruiter. Alternatively, recruiter ratings for a recruiter can be received from each one of a plurality of jobseekers. A total recruiter rating can be calculated by averaging the recruiter ratings.

A recruiter profile can be tagged with a high modification indicator if the modification rate is higher than a predetermined modification threshold. A search for job listings can be received from a jobseeker. The search for job listings can include search criteria. A list of search results that match the search criteria is identified. The list of search results can include at least one job listing posted by the recruiter. The relevancy of the at least one job listing in the list of search results is decreased if the recruiter profile includes a high modification indicator.

DRAWINGS

The features and objects of alternate embodiments of the present disclosure will become more apparent with reference to the following description taken in conjunction with the accompanying drawings of various examples wherein like reference numerals denote like elements and in which:

FIG. 4 depicts an exemplary user interface for posting a job listing according to one embodiment.

DETAILED DESCRIPTION

The system and method disclosed herein permits the implicit and explicit ratings of recruiter activities in order to monitor recruiter abuse. Implicit ratings can be derived from the recruiter's frequency of posting job listings. Explicit ratings can be derived from cumulative ratings that jobseekers have provided in relation to recruiters. Based on implicit recruiter ratings, a recruiter, or a job listing posted by the recruiter, can be tagged as having a high modification indicator. Based on explicit recruiter ratings, a recruiter, or a job listing posted by the recruiter, can be tagged as having a low reputation indicator. Once tagged, job listings of recruiters are decreased in relevant and position so as to be presented towards the end of a search result. In addition, because the recruiter is dynamically and constantly rated, the tag of high modification indicator can be removed once the modification rate of the recruiter decreases. Likewise, the tag of low reputation indicator can be removed once the recruiter rating increases.

Figure 1:
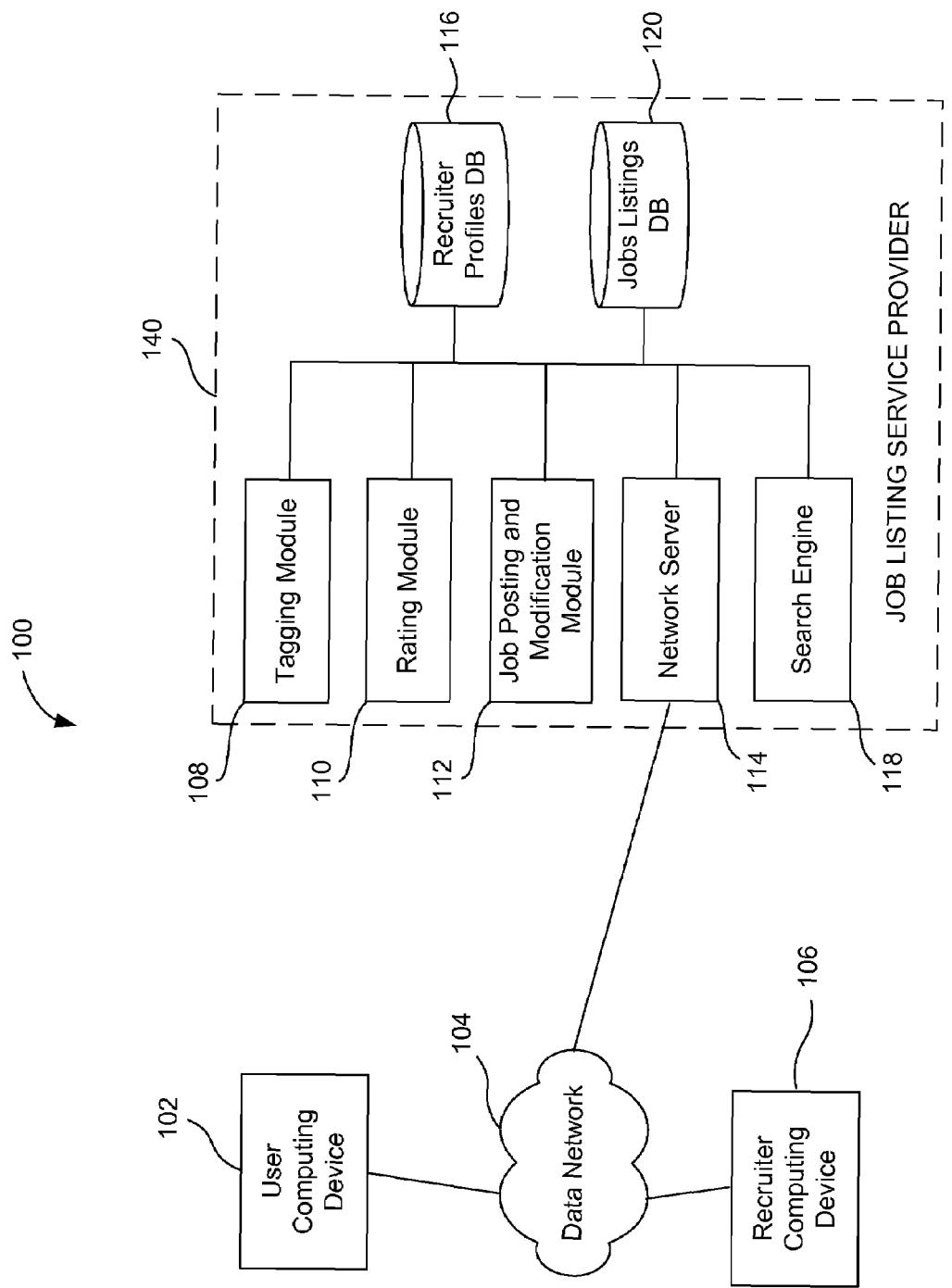
FIG. 1 depicts a component diagram of a system for providing recruiter ratings according to one embodiment.

FIG. 1 depicts a component diagram of a system for providing recruiter ratings according to one embodiment. In one embodiment, the job listing service provider 140 can host an online service of listing, posting and searching jobs. As such the job listing service provider 140 can be a business entity that owns and operates a computer infrastructure connected to a data network in order to provide a job listing service.

Jobseekers can access the services provided by the job listing service provider 140 via a data network 104. In one embodiment, the data network 104 is the Internet. In another embodiment, the data network 104 is an intranet. A jobseeker can utilize a jobseeker computing device 102 to communicate via the data network 104 with one or more computing modules and or services that are part of the computer infrastructure managed by the job listing service provider 140. In addition, a recruiter can utilize a recruiter computing device 106 to communicate via the data network 104 with one or more computing modules and or services that are part of the computer infrastructure managed by the job listing service provider 140.

In one embodiment, the computer device 102 can be configured with a web browser that allows the user computing device 102 to send data to and receive data from a network server 106. The computing device 102 communicates with the network server to render web pages received from the network server 106, as well as transmit user input to the network server 106. In another embodiment, the user computing device 102 can communicate through the data network 104 via any client-side application configured to communicate in a predetermined protocol with the network server 106.

In one embodiment, a network server 114 can be included as part of the computer infrastructure operated by the listing service provider 140. The network server 114 can be configured with logic to communicate with the jobseeker computing device 102 by sending and receiving data. Likewise, the network server 114 can be configured with logic to communicate with the recruiter computing device 106 by sending and receiving data.

In addition, the network server 114 can be configured to receive job search requests from the jobseeker computing device 102. The job search requests can include search parameters entered by the jobseeker such as location, title, and salary of a job listing. The job search request can then be submitted to a search engine 118 for processing.

In another embodiment, the network server 114 can be configured to receive job listing postings from a recruiter. The network server 114 can be configured to transmit the posting and modification requests to a job posting modification module 112 which can be included as part of the computer infrastructure of the job listing service provider 140.

In another embodiment, the network server 114 can be configured to receive ratings from the jobseeker for one or more recruiters. The network server 114 can be configured to transmit the ratings received from a jobseeker to a rating module 110. The rating module can also be included as part of the computer infrastructure of the job listing service provider 140.

In one embodiment, the job posting and modification module 112 is configured to receive job posting requests from a recruiter. The job posting requests can be received via the network server 114 which in turn receives the requests from a recruiter computing device 106. The job posting request can include the job listing title, description, location, salary information and contact information of the recruiter or employer.

In addition, the job posting and modification module 112 can also be configured to receive edits or modifications to existing job listings previously submitted by a recruiter. As such, the job posting and modification module 112 can have access to the job listings database 120 in order to store and retrieve job listings at the job listings database 120. In addition, the job posting and modification module 112 can utilize one or more algorithms to determine the modification of a posting. For example, a comparison algorithm that performs a word-by-word comparison to determine the text that has been changed. Based on a threshold number of words or characters changed, the algorithm can determine whether the job listing has been reposted, modified, etc.

In another embodiment, the rating module 110 can be configured to interact with the job posting and modification module 112 in order to calculate the rate at which the recruiter modifies job postings that the recruiter has already submitted. As such, the rating module 110 can be configured to calculate the modification rate of each recruiter based on one or more formulas. In one embodiment, the modification rate of a recruiter is calculated by dividing the number of modifications or edits to one or more job listings of the recruiter during a pre-determined amount of time by the total number of job postings. For example, the following formula can be utilized: Modification Rate=Number of Modifications/(Number of Job Listings posted by the recruiter ★ number of days). In another example, the period of time can be counted based on the number of hours, weeks, months, or any other unit of time.

By way of example, if the number of job listing modifications of a recruiter is two and the total number of job listings posted by the recruiter is nine, the modification rate calculated for the recruiter would be dependent on the number of days or another time measurement that would be also included in the calculation. As such, the modification rate of the recruiter who modified two job listings and posted nine job listings within a period of two days would be two divided by eighteen, or one-ninth. In another embodiment, the rating module 110 can calculate the modification rate using any other known formulas for calculating modification rates already known or to be known in the art.

Once the rating module 110 calculates the modification rate, the rating module 110 can store the modification rate in the recruiter profile which in turn is located at the recruiter's profiles database 116.

In another embodiment, the rating module 110 can also be configured to receive from jobseekers ratings that are indicative of the reputation of the recruiter. As such, the rating module 110 can be configured with logic to receive ratings from various jobseekers and calculate an average for a given recruiter. The rating module 110 can also be configured to store the calculated average in the recruiter profiles database 116 in the recruiter profile.

In yet another embodiment, a tagging module 108 can be configured to communicate with the rating module 110 in order to determine whether a recruiter should be tagged as having a high modification indicator. Thus, for example, the recruiter can be tagged with a high modification indicator if the modification rate of the recruiter is higher than a predetermined modification threshold.

In a further embodiment, the tagging module 108 can be configured to communicate with the rating module 110 in order to determine whether a recruiter should be tagged as having a low reputation indicator. A recruiter can be tagged with a low reputation indicator if the total recruiter rating based on the jobseekers' ratings of the recruiter is lower than a predetermined reputation threshold.

As such, the tagging module 108 can be configured with logic to access the recruiter profiles database 116 and store either the tag for low reputation as a low reputation indicator or a tag for high modification indicator in association with the profile of the recruiter. In a further embodiment, the tagging module 108 can additionally, or alternatively, tag job listings located at the job listings database 120 with tags indicating that the particular job listing is associated with a recruiter having a high modification indicator. Likewise, job listings database 120 can also be tagged by a tagging module 108 with tags indicative of being associated with a recruiter having a low reputation indicator.

In another embodiment, a search engine 118 can be included as part of the computer infrastructure operated by the listing service provider 140. The search engine 118 can communicate with the job listings database 120 to retrieve job listing data and compare against search queries entered by jobseekers. As such, the search engine 118 can include logic that compares metadata of each job listing located in the job listings database 120 against search criteria in order to populate a list of job listings that are relevant to the search of the jobseekers.

In addition, the search engine 118 can be configured with logic to organize the job listings search results by decreasing the relevancy of a job listing within job listings search results. As such the search engine 118 is configured to determine whether any of the job listings in the resulting set is associated with a recruiter that has been tag with a low reputation indicator or a high modification indicator. If the search engine 118 determines that a job listing in the resulting set has associated metadata indicative of an associated recruiter with a high modification indicator or a low reputation indicator, the search engine 118 can be configured to reprioritize the exposure of the job listing such that the job listing can be listed toward the end of the resulting set and therefore have less visibility when displayed or presented to the jobseeker. These methods serve to penalize the recruiters who modify job listings with a frequency that is obtrusive to allowing jobseekers to view fresh job listings.

In another embodiment, the search engine 118 can also be configured to search the recruiter profiles database 116 in order to search whether associated recruiters have profiles tagged with a low reputation indicator or a high modification indicator. Thus, in cases where the job listing itself does not have associated metadata indicative of recruiter tag indicators, the search engine 118 can be configured to search recruiter profiles for recruiters corresponding to job listings in the resulting set and determine whether the profile of such recruiters has been tagged with a high modification indicator or with a low reputation indicator.

While various databases have described herein, one skilled in the art will recognize that each of the aforementioned databases can be combined into one or more data repositories, and be located either locally or remotely. In addition, each of the aforementioned databases can be any type of data repository configured to store data and can be implemented using any methods of storage now known or to become known. Likewise, while various modules have described herein, one skilled in the art will recognize that each of the aforementioned modules can be combined into one or more modules, and be located either locally or remotely. Each of these modules can exist as a component of a computer program or process, or be standalone computer programs or processes recorded in a data repository.

Figure 2:
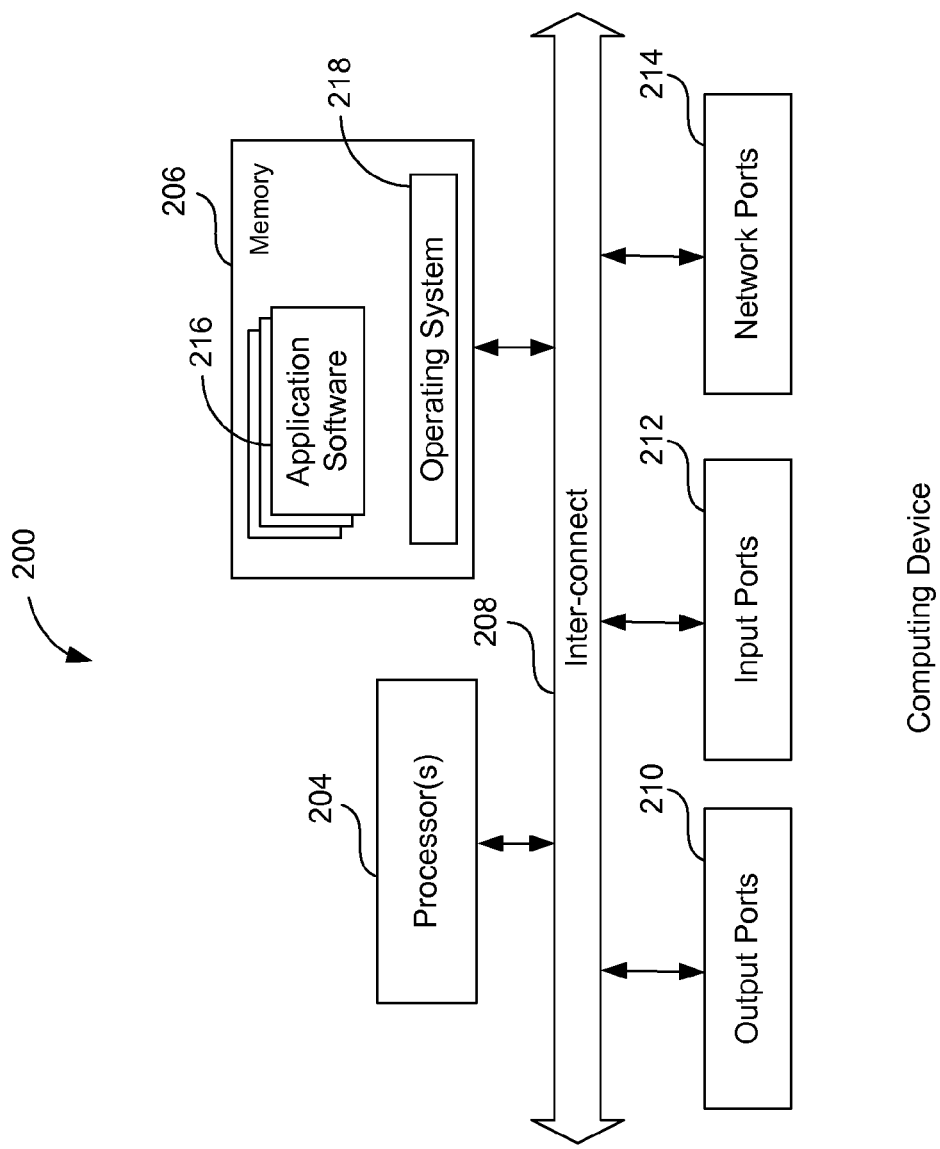
FIG. 2 depicts a component diagram of a computing device according to one embodiment.

FIG. 2 depicts a component diagram of a computing device according to one embodiment. The computing device 200 can be utilized to implement one or more computing devices, computer processes, or software modules described herein. In one example, the computing device 200 can be utilized to process calculations, execute instructions, receive and transmit digital signals, as required by the jobseeker computing device 102. In another example, the computing device 200 can be utilized to process calculations, execute instructions, receive and transmit digital signals, receive and transmit search queries, job listings, and hypertext, as required by the tagging module 108, the rating module 110, the job posting and modification module 112, the network server 114, and/or the search engine 118.

The computing device 200 can be any general or special purpose computer now known or to become known capable of performing the steps and/or performing the functions described herein, either in software, hardware, firmware, or a combination thereof.

The computing device 200 includes an inter-connect 208 (e.g., bus and system core logic), which interconnects a microprocessor(s) 204 and memory 206. The inter-connect 208 interconnects the microprocessor(s) 204 and the memory 206 together. Furthermore, the interconnect 208 interconnects the microprocessor 204 and the memory 206 to peripheral devices such input ports 212 and output ports 210. Input ports 212 and output ports 210 can communicate with I/O devices such as mice, keyboards, modems, network interfaces, printers, scanners, video cameras and other devices. In addition, the output port 210 can further communicate with the display 104.

Furthermore, the interconnect 208 may include one or more buses connected to one another through various bridges, controllers and/or adapters. In one embodiment, input ports 212 and output ports 210 can include a USB (Universal Serial Bus) adapter for controlling USB peripherals, and/or an IEEE-1394 bus adapter for controlling IEEE-1394 peripherals. The inter-connect 208 can also include a network connection 214.

The memory 206 may include ROM (Read Only Memory), and volatile RAM (Random Access Memory) and non-volatile memory, such as hard drive, flash memory, etc. Volatile RAM is typically implemented as dynamic RAM (DRAM), which requires power continually in order to refresh or maintain the data in the memory. Non-volatile memory is typically a magnetic hard drive, flash memory, a magnetic optical drive, or an optical drive (e.g., a DVD RAM), or other type of memory system which maintains data even after power is removed from the system. The non-volatile memory may also be a random access memory.

The memory 206 can be a local device coupled directly to the rest of the components in the data processing system. A non-volatile memory that is remote from the system, such as a network storage device coupled to the data processing system through a network interface such as a modem or Ethernet interface, can also be used. The instructions to control the arrangement of a file structure may be stored in memory 206 or obtained through input ports 212 and output ports 210.

In general, routines executed to implement one or more embodiments may be implemented as part of an operating system 218 or a specific application, component, program, object, module or sequence of instructions referred to as application software 216. The application software 216 typically can comprises one or more instruction sets that can be executed by the microprocessor 204 to perform operations necessary to execute elements involving the various aspects of the methods and systems as described herein. For example, the application software 216 can include video decoding, rendering and manipulation logic.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others. The instructions may be embodied in digital and analog communication links for electrical, optical, acoustical or other forms of propagated signals, such as carrier waves, infrared signals, digital signals, etc.

Figure 3A:
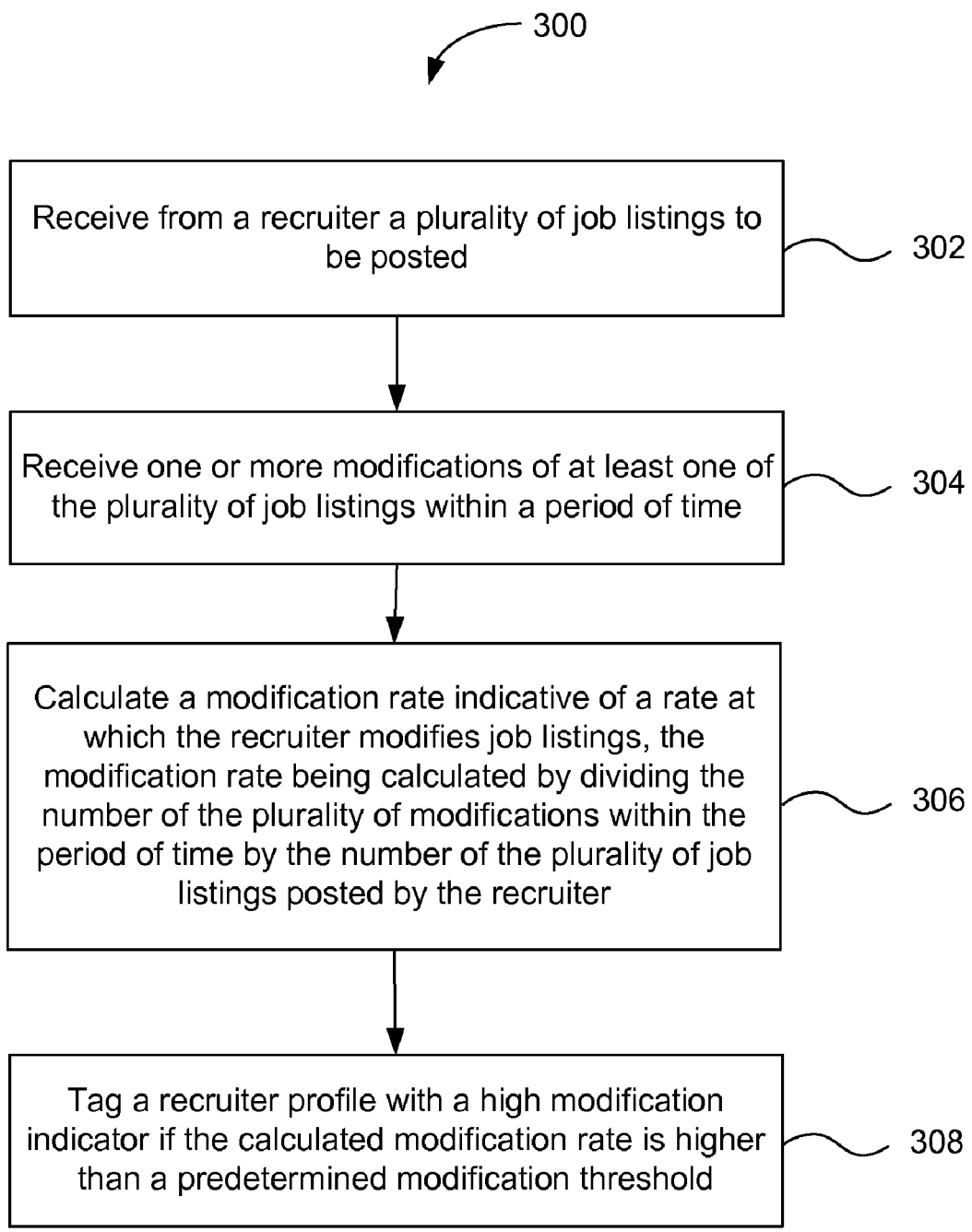
FIG. 3A depicts a flow diagram of a process for providing a recruiter rating according to one embodiment.

FIG. 3A depicts a flow diagram of a process for providing a recruiter rating according to one embodiment. At process block 302, a plurality of job listings to be posted is received from a recruiter. Process 300 continues at process block 304. At process block 304, one or more modifications to at least one of the plurality of job listings are received within a period of time. Process 300 continues at process block 306. At process block 306, a modification rate is calculated. The modification rate can be indicative of the rate at which a recruiter modifies the job listings posted by the recruiter. The modification rate can be calculated by dividing the number of the plurality of modifications made within the period of time by the number of the plurality of job listings posted by the recruiter. Process 300 continues at process block 308. At process block 308, a recruiter profile is tagged with a high modification indicator if the calculated modification rate is higher than a predetermined modification threshold.

Figure 3B:
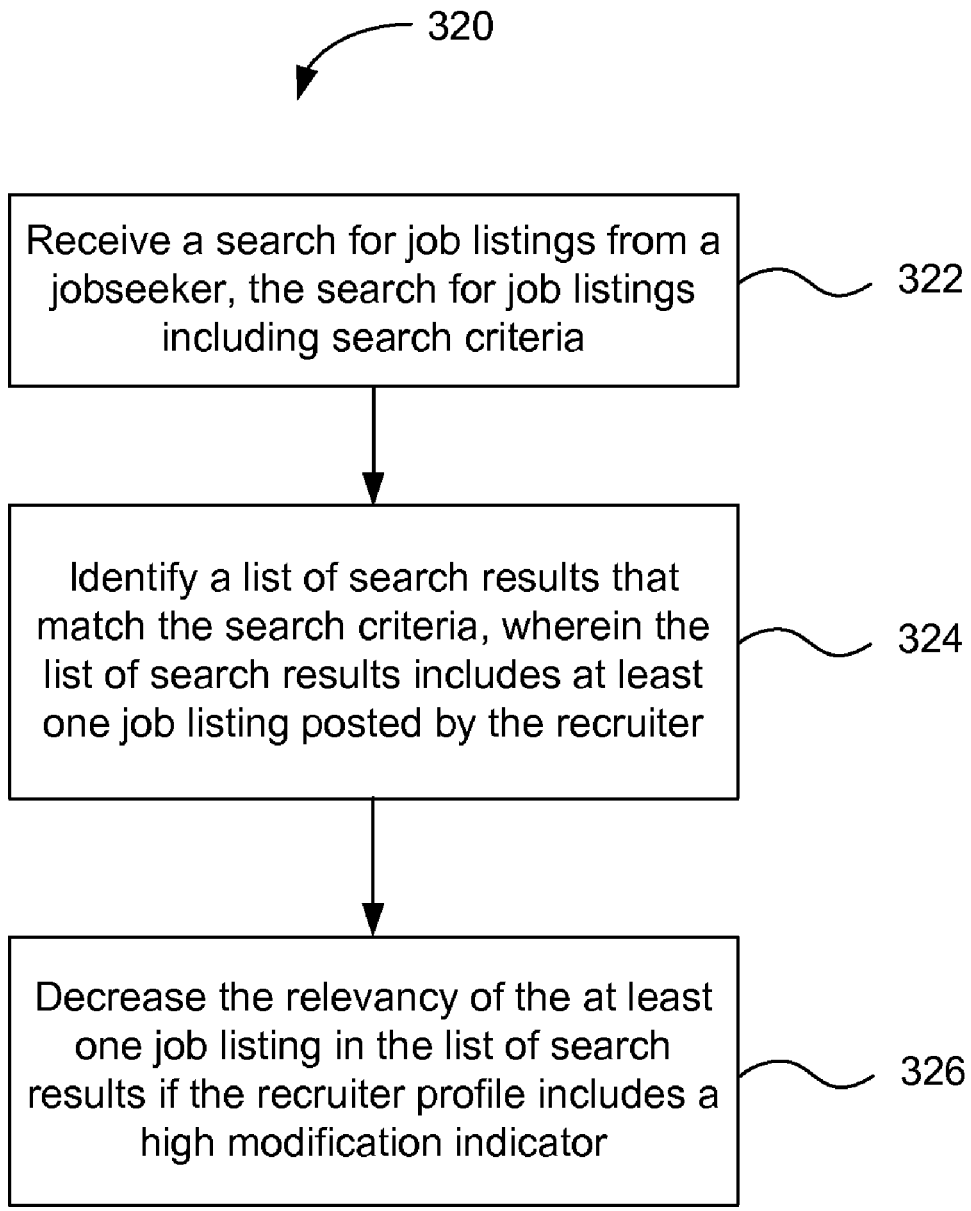
FIG. 3B depicts a flow diagram of a process for providing job search results to a jobseeker according to one embodiment.

FIG. 3B depicts a flow diagram of a process for providing job search results to a jobseeker according to one embodiment. At process block 322, a search for job listings is received from a jobseeker. The search can include search criteria such as occupation, job title, location, etc. Process 320 continues at process 324. At process block 324, a list of search results that match the search criteria is identified. The list of search results includes at least one job listing posted by the recruiter. Process 320 continues at process block 326. At process block 326, the relevancy of at least one job listing in the list of search results is decreased if the recruiter profile includes a high modification indicator. As such, if the recruiter profile includes the high modification indicator any job listings posted by the recruiter are demoted in the list that is presented to the jobseeker, such that the recruiter's job listings are shown towards the end of the list.

FIG. 4 depicts an exemplary user interface for posting a job listing according to one embodiment. The user interface 400 can be provided by the job listing service provider 140 as part of a website or other application. A recruiter such as an employer can enter a new job listing in the user interface 400 which can later be displayed at a website of the job listing service provider 140. A title field 402 can be provided to enter a title or designation for the job listing. Attribute fields 404 can be provided for entering further information regarding the listing being entered. For example, for a job listing, attributes that can be entered in the attribute fields 404 include company, experience, salary, degree, start date, location, etc. In addition, a keyword field 408 and a description field 410 can also be provided to the recruiter in order to further qualify and/or describe the listed job.

Figure 5:
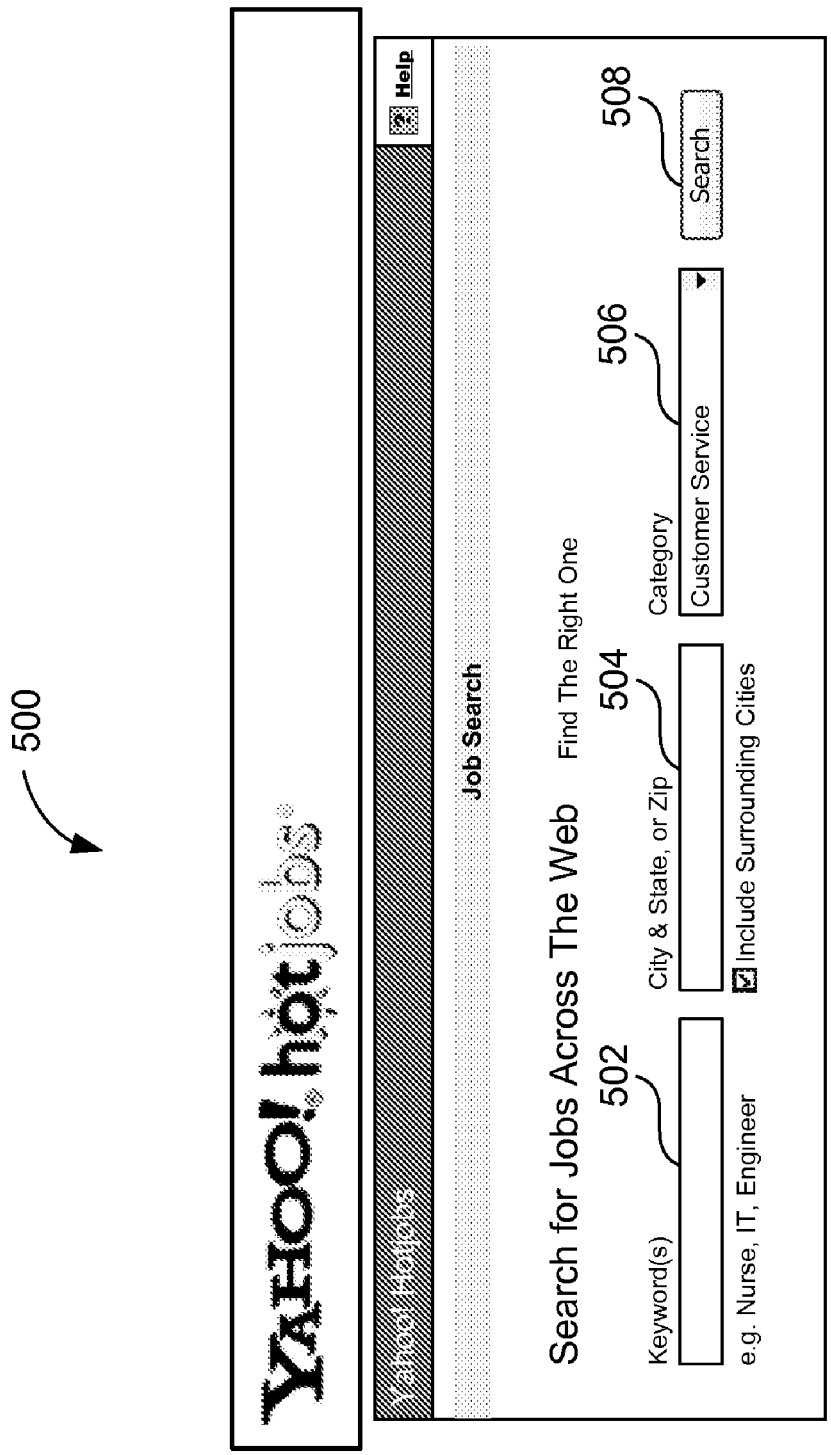
FIG. 5 depicts an exemplary user interface for permitting a jobseeker to enter a job search according to one embodiment.

FIG. 5 depicts an exemplary user interface for permitting a jobseeker to enter a job search according to one embodiment. User interface 500 includes text fields 502 and 504 that a jobseeker can utilize to enter searching criteria. For example, in text field 502 a jobseeker can enter certain keywords that can be utilized to locate job listings that have metadata associated with such keywords. In addition, the jobseeker can also enter city, state or zip code as well as selecting whether surrounding cities can be included at text field 504.

Furthermore, user interface 500 can also include a drop down menu 506 that would permit a jobseeker to enter a category of the job listing provided. Examples of categories can include customer service, technology, legal, entertainment, sales, etc. In addition, a search button 508 can be also provided in order to execute a search.

As previously discussed, a search engine 118 can utilize searched words entered in the job search in order to retrieve job listings from the job listings database 120. Thus, keywords entered into text field 502, as well as the location entered in 504, and job industries or categories located in 506, can be utilized as part of the search of the job listings database 120. If for example the jobseeker enters the keywords "software" and "engineer" in text field 502, the job listings provided would include any job listing that has as part of the title or metadata associated with the job listing the words engineer and software. Furthermore, the search engine 118 can display job listings search results according the modification rates and total reputation rating of the recruiters associated with each job listing in the list of search results.

Figure 6:
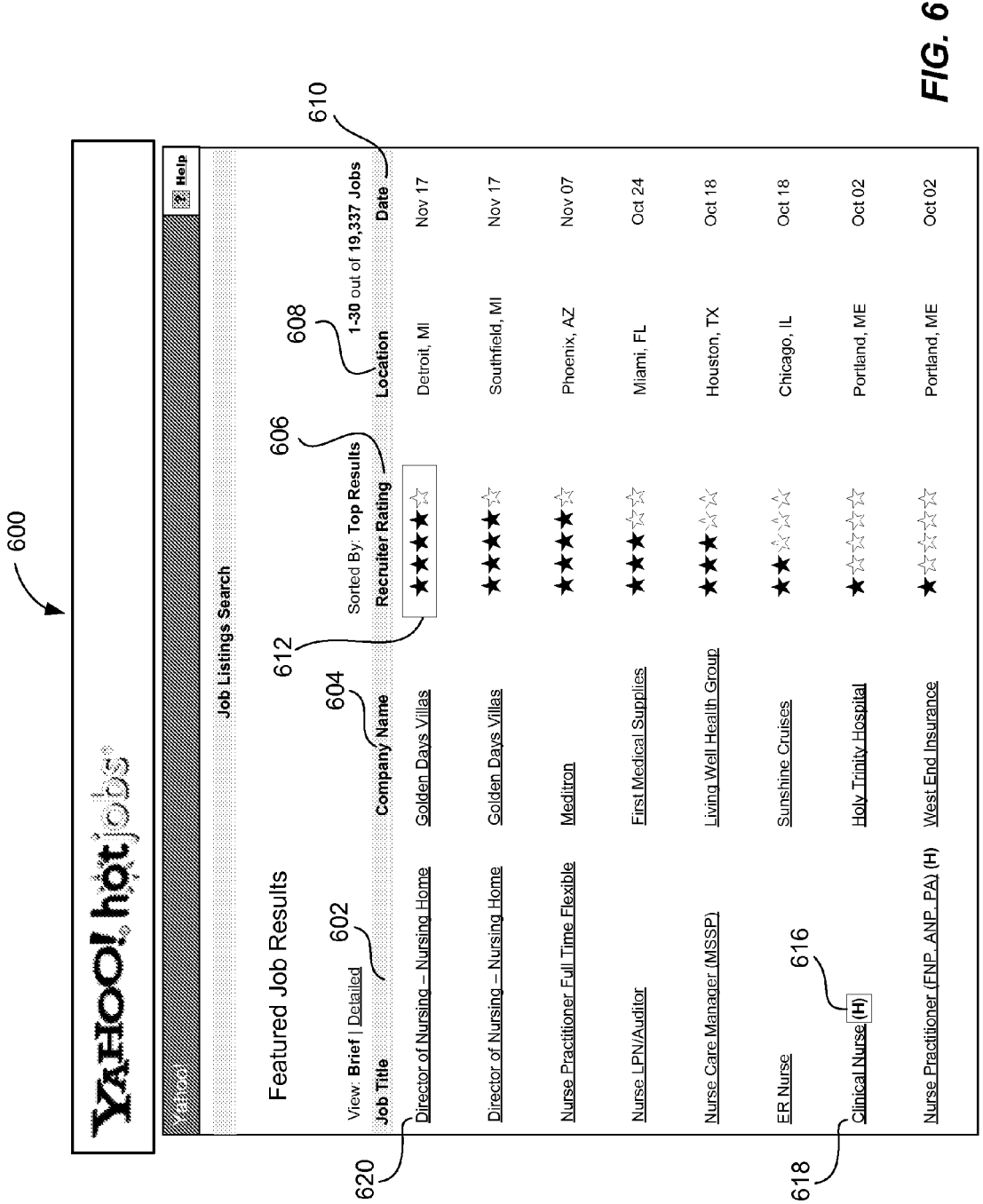
FIG. 6 depicts an exemplary user interface for providing job search results to a jobseeker according to one embodiment.

FIG. 6 depicts an exemplary user interface for providing job search results to a jobseeker according to one embodiment. The user interface 600 includes a listing or set of job search results that result from a query received from a jobseeker. The list of job listings can include job title information 602, company name information 604, rating information 606, location information 608 and date 610. The lists of jobs provided in user interface 600 has been reordered and reprioritized based on high modification indicators associated with each recruiter as well as low reputation indicators associated with each recruiter. In addition, listings having a high modification indicator can be provided towards the bottom of the list of user interface 600. For example, listing 618 for a clinical nurse can be displayed towards the end of the list because listing 618 has been posted by a recruiter that has been tagged with a high modification indicator.

In one embodiment, a jobseeker viewing the list of jobs provided in user interface 600 can also further rate the listed recruiters. For example, a jobseeker can rate the recruiter "Golden Days Villas" listed as part of job listing 620 by selecting the rating from user interface 612. Job listing 620 shows a rating 612 of four stars. This is the rating provided by the jobseekers in relation to the recruiter of job listing 620. In one example, rating of four stars out of five stars indicates that the total recruiter rating is generally high and therefore does not have an associated low reputation indicator. In one embodiment, the rating of the recruiter by the jobseeker is not visible to the recruiter or other jobseekers.

In one embodiment, the job listing 618 can be display in association with a marker 616 which indicates to a jobseeker that the job listing 618 is associated with a recruiter having a high modification indicator. This allows jobseekers to identify those job listings that have been frequently modified by the associated recruiter. Thus, jobseekers can be presented with truly new job listings at the top of the list.

Figure 7:
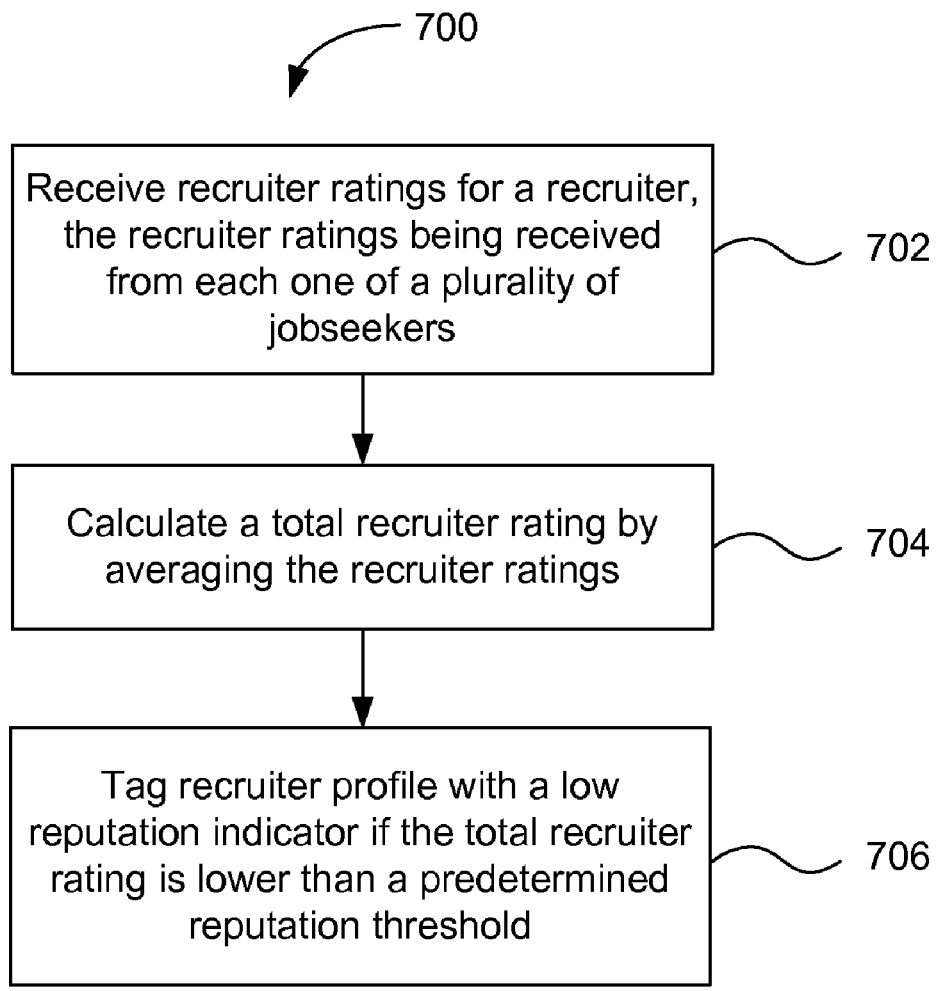
FIG. 7 depicts a flow diagram of a process for providing a recruiter rating according to another embodiment.

FIG. 7 depicts a flow diagram of a process for providing a recruiter rating according to another embodiment. At process block 702, recruiter ratings are received from one or more job seekers. The recruiter ratings correspond to ratings that job seekers have submitted in relation to a specific recruiter. Process 700 continues at process block 704. At process block 704, a total recruiter rating is calculated by averaging the recruiter ratings. Therefore, in one embodiment, the total recruiter rating can be calculated by adding the scores provided by each of the jobseekers and dividing such sum of jobseekers' scores by the number of jobseekers who provided a rating for the recruiter. Process 700 continues at process block 706.

At process block 706, the recruiter's profile is tagged with a low reputation indicator if the total recruiter rating calculated is lower than a predetermined reputation threshold. Once the recruiter profile has been tagged with a low reputation indicator, further searches for job listings provided by the recruiter would be provided with lowered priority or relevance in search results for jobseeker searches.

As new ratings for each recruiter continue to be recalculated by the rating module 110, the tagging module 108 can remove low reputation indicators and/or high modification indicators from recruiter profiles so as to permit and encourage recruiters to stop high modification activity in order to allow the listings of the recruiter to be listed at the top of the job listing search result set when newly posted.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

The invention claimed is:

1. A method of providing a rating of a recruiter, comprising:
    receiving from a recruiter a plurality of job listings to be posted;
    receiving one or more modifications of at least one of the plurality of job listings within a period of time;
    calculating, by a processor, a modification rate indicative of a rate at which a recruiter modifies job listings, the modification rate being calculated by dividing the number of the one or more modifications by the number of the plurality of job listings posted by the recruiter; and
    tagging a recruiter profile with a high modification indicator if the calculated modification rate is higher than a predetermined modification threshold.

2. The method of claim 1, further comprising:
    receiving a search for job listings from a jobseeker, the search for job listings including search criteria;
    identifying a list of search results that match the search criteria, wherein the list of search results includes at least one job listing posted by the recruiter; and
    decreasing the relevancy of the at least one job listing in the list of search results if the recruiter profile includes a high modification indicator.

3. The method of claim 2, wherein decreasing the relevancy comprises reprioritizing the list of search results such that the at least one job listing is displayed towards the bottom of a display of the list of search results.

4. The method of claim 1, further comprising tagging the job listings associated with the recruiter with a high modification indicator.

5. The method of claim 1, further comprising removing the high modification indicator when the calculated modification rate is lower than the predetermined modification threshold.

6. A system of providing a rating of a recruiter, comprising:
    a job posting and modification module that receives from a recruiter a plurality of job listings to be posted, the job posting and modification module further configured to receive one or more modifications of at least one of the plurality of job listings within a period of time;
    a rating module, implemented by a processor, that calculates a modification rate indicative of a rate at which a recruiter modifies job listings, the modification rate being calculated by dividing the number of the plurality of modifications by the number of the plurality of job listings posted by the recruiter; and
    a tagging module that tags a recruiter profile with a high modification indicator if the calculated modification rate is higher than a predetermined modification threshold.

7. The system of claim 6, further comprising a search engine that receives a search for job listings from a jobseeker, the search for job listings including search criteria, the search engine further configured to identify a list of search results that match the search criteria, wherein the list of search results includes at least one job listing posted by the recruiter, wherein the search engine decreases the relevancy of the at least one job listing in the list of search results if the recruiter profile includes a high modification indicator.

8. The system of claim 7, wherein the search engine decreases the relevancy by reprioritizing the list of search results such that the at least one job listing is displayed towards the bottom of a display of the list of search results.

9. The system of claim 6, wherein the tagging module is further configured to tag the job listings associated with the recruiter with a high modification indicator.

10. The system of claim 6, wherein the tagging module is further configured to remove the high modification indicator when the calculated modification rate is lower than the predetermined modification threshold.

11. A method of providing a rating of a recruiter, comprising:
    calculating, by a processor, a modification rate indicative of a rate at which a recruiter modifies job listings previously posted by the recruiter, the modification rate being calculated by dividing the number of modifications made in a period of time by the number of job listings posted by the recruiter;
    tagging a recruiter profile with a high modification indicator if the modification rate is higher than a predetermined modification threshold;
    receiving a search for job listings from a jobseeker, the search for job listings including search criteria;
    identifying a list of search results that match the search criteria, wherein the list of search results includes at least one job listing posted by the recruiter; and
    decreasing the relevancy of the at least one job listing in the list of search results if the recruiter profile includes a high modification indicator.

12. A method of providing a rating of a recruiter, comprising:
    receiving recruiter ratings for a recruiter, the recruiter ratings being received from each one of a plurality of jobseekers;

calculating, by a processor, a total recruiter rating by averaging the recruiter ratings;

tagging a recruiter profile with a low reputation indicator if the total recruiter rating is lower than a predetermined reputation threshold;

receiving a search for job listings from a jobseeker, the search for job listings including search criteria;

identifying a list of search results that match the search criteria, wherein the list of search results includes at least one job listing posted by the recruiter; and decreasing the relevancy of the at least one job listing in the list of search results if the recruiter profile includes a low reputation indicator.

* * * * *